No. 747,064. PATENTED DEC. 15, 1903.
T. GUNDERSON.
SNOW OR ICE AUTOMOBILE.
APPLICATION FILED APR. 29, 1903.
NO MODEL. 3 SHEETS—SHEET 3.
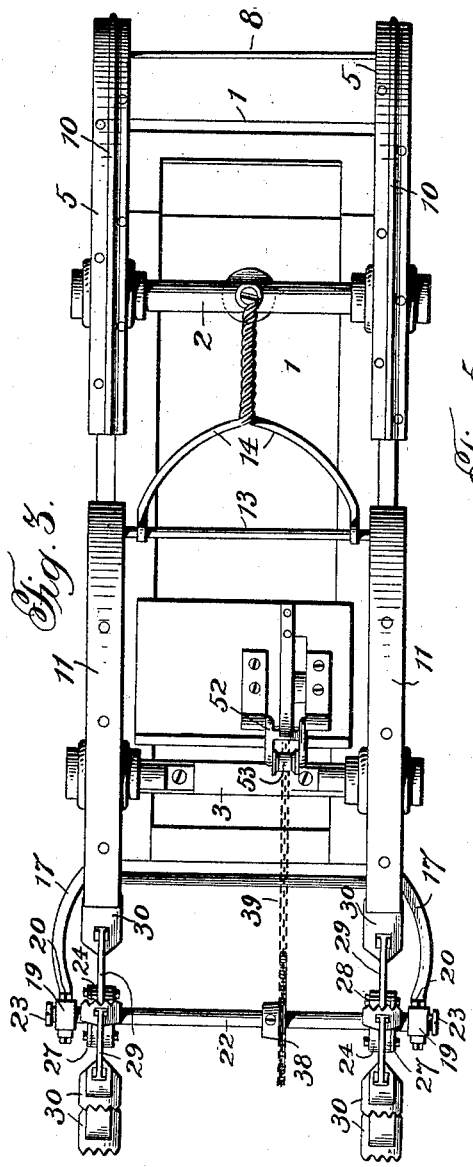
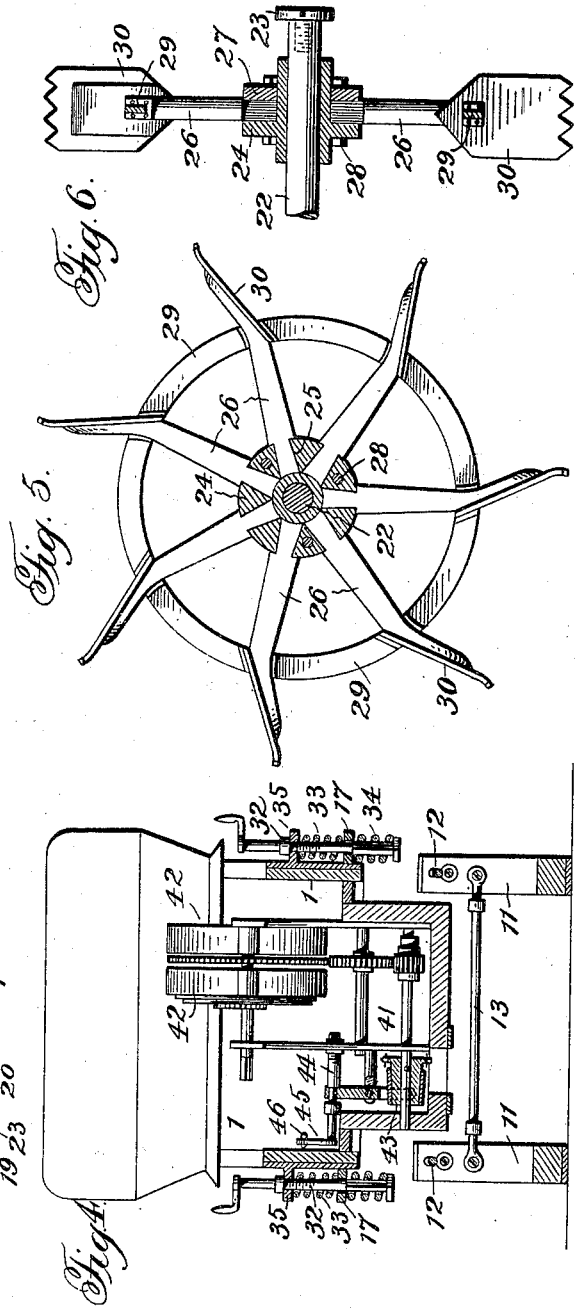
Witnesses:
Jas E Hutchinson
John Seay
Inventor:
Thomas Gunderson,
By Swift & Co.
atty's No. 747,064. Patented December 15, 1903.

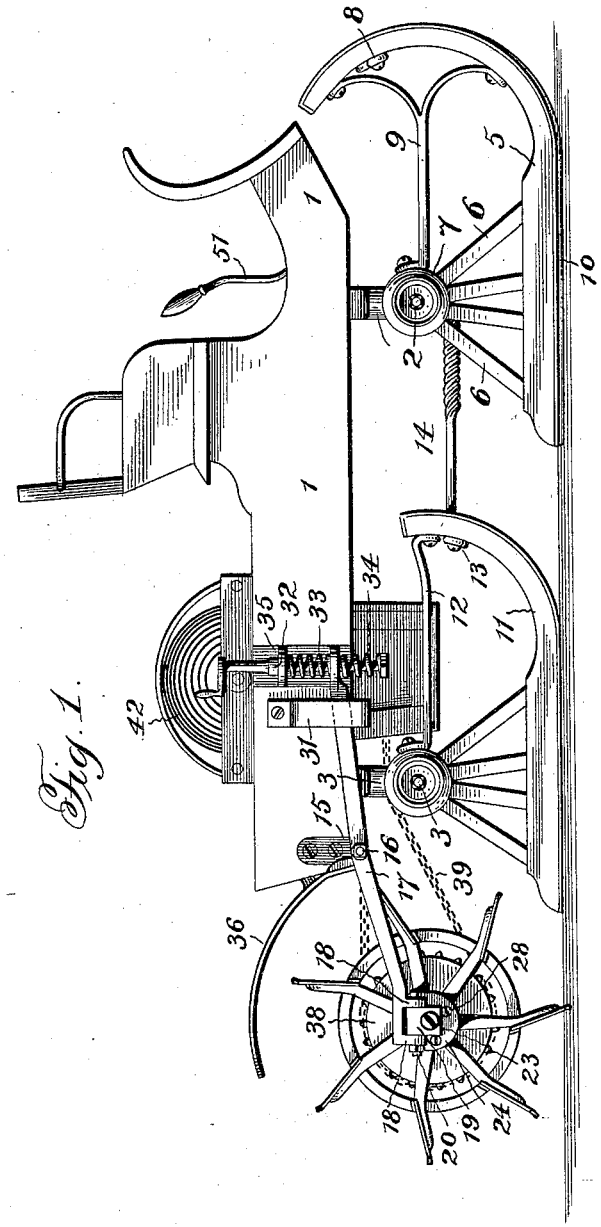

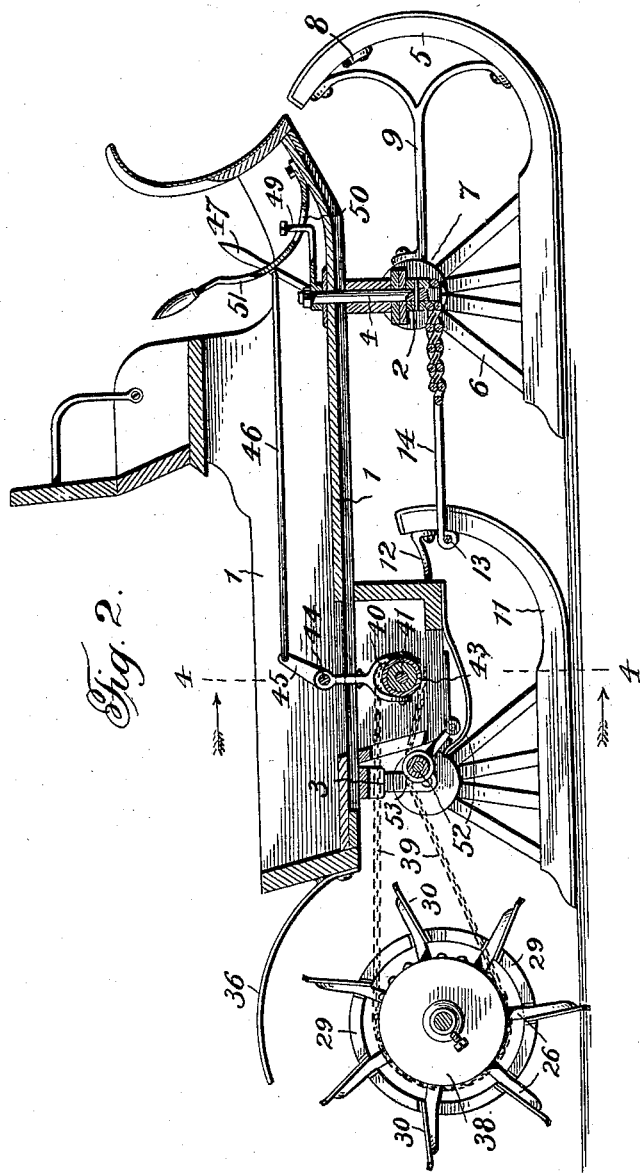

UNITED STATES PATENT OFFICE.

THOMAS GUNDERSON, OF McINTOSH, MINNESOTA.

SNOW OR ICE AUTOMOBILE.

SPECIFICATION forming part of Letters Patent No. 747,064, dated December 15, 1903.

Application filed April 29, 1903. Serial No. 154,827. (No model.)

*To all whom it may concern:*

Be it known that I, THOMAS GUNDERSON, a citizen of the United States, residing at McIntosh, in the county of Polk and State of Minnesota, have invented a new and useful Snow or Ice Automobile; and I do hereby declare the following to be a full, clear, and exact description of the invention, such as will enable others skilled in the art to which it appertains to make and use the same.

The invention relates to a snow and ice automobile, and has for its object to improve the construction of self-propelled sleighs and to increase the efficiency of the same and to provide a simple and comparatively inexpensive one of great strength and durability adapted to operate effectively on soft snow, ice, and rough roads.

A further object of the invention is to provide a snow and ice automobile of this character adapted to be easily steered and capable of being gradually stopped and of adjusting itself to any unevenness in the surface of a roadway.

The invention also has for its object to increase the efficiency of the propelling mechanism and to enable the propelling-wheels to sink readily into a rut or depression without jarring or affecting the equilibrium of the body.

Another object of the invention is to enable the propelling-wheels to be readily repaired when broken or otherwise injured without discarding an entire wheel.

With these and other objects in view the invention consists of the construction and novel arrangement of parts hereinafter described and shown, and particularly pointed out in the claims hereto appended.

In the drawings forming part of this specification, and in which like numerals of reference designate corresponding parts, Figure 1 is a side elevation of an ice and snow automobile constructed in accordance with this invention. Fig. 2 is a longitudinal sectional view of the same. Fig. 3 is a reverse plan view. Fig. 4 is a transverse sectional view on the line 4 4 of Fig. 2. Fig. 5 is a detail sectional view of one of the propelling-wheels, the hub-plate being removed. Fig. 6 is a sectional view of one of the propelling-wheels.

Referring to the drawings, 1 designates the body, which may be of any desired construction and which is provided with front and rear axles 2 and 3, the front axle being pivoted by a king-bolt 4 and receiving the runners 5 of the front bob. The runners 5 are provided with knees consisting of a series of spokes or braces 6 and hubs 7, which are secured to the spindles of the front axle by axle-nuts in the ordinary manner, and each front runner has a limited oscillatory movement independent of the other to permit them to conform readily to the character of the roadway. The front runners, which are pivotally connected to a transverse rod 8, are supported or strengthened by braces 9, extending forward from the hub and having forked front portions, which are secured to the upwardly-extending curved front portion of the runners, which firmly brace the same to prevent the runners from being broken should they come in contact with an obstruction. Each front runner is provided with a metallic shoe, to which is secured a longitudinal rib 10, adapted to be partially embedded in the snow and capable of enabling the front bob to obtain a firm hold on the same, whereby the automobile may be readily and accurately steered.

The rear axle, which is arched, as shown, receives the rear runners 11 of the rear bob. The rear runners, which are constructed substantially as the front runners with the exception that they are provided with single bracing-rods 12, are pivotally connected to a transverse rod 13, which forms a pintle for a reach 14, consisting of a front stem and a rear fork. The stem is pivoted to the front axle by the king-bolt, and the sides of the fork are provided with eyes to receive the transverse connecting-rod 13.

The body is provided at opposite sides with hangers 15, depending slightly from the rear end of the body and forming supports for pivot-bolts 16, which fulcrum rods or levers 17 on the body. The rods or levers 17 are pivoted between their ends and are provided at their rear ends with depending perforated ears 18, receiving bearing-blocks 19, secured to the perforated ears by longitudinal pivots 20. The pivots 20 pass through the bearing-blocks 19 above the centers thereof to permit the bearing-blocks to swing transversely to allow a pair of propelling-wheels to drop into concavities or depressions of a roadway. The propelling-wheels are mounted on a transverse shaft or axle 22, provided at their ends with screws 23, having enlarged heads or shoulders adapted to prevent the shaft or axle from becoming displaced through any lateral movement of the bearing-blocks.

Each propelling-wheel is provided with a hub 24, having a series of recesses 25 to receive the inner ends of spokes 26, which are retained in the recesses by plates 27, fastened to the hubs by bolts 28, which are arranged between the spokes. The spokes, which are connected by curved braces 29, are bent between their ends at the points of attachment of the braces to arrange the outer portions, which lie beyond the braces, at an angle to the inner portions. The curved braces, which form an annular rim, are provided at their ends with ears or flanges secured to the braces by countersunk fastening devices. The outer portions of the spokes are provided with blades 30, having their outer ends bent backward in the opposite direction to the bend of the spokes and provided with teeth. These blades, which may be of any desired width and which are detachable to permit blades of different width to be employed, are adapted to pack the snow and enable the propelling-wheels to obtain a firm hold on the same.

The front arms of the side rods are arranged in guides or keepers 31, and the front terminals of such rods are perforated for the reception of adjusting-screws 32, on which are arranged upper and lower springs 33 and 34, the lower springs being heavier than the upper ones for holding the propelling-wheels against the snow or ice. The screws, which are provided at their upper ends with cranks, engage threaded openings of brackets 35, and these brackets are mounted on the exterior of the sides of the body, as shown. The lower portions of the screws are preferably squared to engage the lower springs; but they may be of any other desired construction. By adjusting the screws any spring tension may be obtained to secure the desired engagement of the propelling-wheels with the surface over which the automobile is traveling, and the adjustment may be made while the automobile is in motion.

The body is provided at its rear end with suitable fenders 36, and the shaft or axle has centrally secured to it a sprocket-wheel 38, connected by an endless chain 39 with a sprocket-pinion 40 of a shaft 41. The shaft 41 is connected by a train of gears with a suitable motor 42. Although a spring-motor is shown in the accompanying drawings, an electric, gasolene, or any other form of motor may be employed, as will readily be understood. Any suitable means may be employed for throwing the motor into and out of operation.

The motor is preferably provided with a brake-wheel 43, arranged to be engaged by a shoe of a transversely-adjustable shaft 44, arranged in the form of a rock-shaft and provided with an arm 45, which is connected by a rod 46 with an operating-lever 47.

The king-bolt is fixed to the front axle and is provided with a forwardly-extending arm having an upturned end 49, which is arranged in a slot 50 of a steering-lever 51. The steering-lever, which is sigmoidly curved, is fulcrumed at one end and extends upward toward the seat of the body, terminating in a suitable grip or handle. The steering-lever is adapted to be swung laterally to change the direction of the front bob of the sleigh.

The endless chain of the driving mechanism is located in the arch of the rear axle, and the lower flight of the chain is engaged by a tension device 52, consisting of a spring, secured at one end and provided at the other end with a roller 53, mounted in a bifurcation of an oscillatory link. The spring engages the link, which is pivoted at one end and which is swung upward against the chain by spring-pressure.

What I claim is—

1. In a snow and ice automobile, the combination of a body, and an arched rear axle, rear runners, a shaft mounted in the rear of the body and having propelling-wheels, sprocket-gearing connected with the rear shaft and arranged in the arch of the axle, a link pivotally mounted at one end and provided at the other end with an antifriction device, and a spring engaging the link and holding the antifriction device against the chain of the sprocket-gearing, substantially as described.

2. In a snow and ice automobile, the combination of a body, side rods fulcrumed on the body, laterally-swinging bearing-blocks carried by the rods, a shaft journaled on the bearing-blocks, and propelling-wheels carried by the shaft, substantially as described.

3. In a snow and ice automobile, the combination of a body, rods fulcrumed on the body and provided with laterally-swinging bearing-blocks, a shaft carried by the bearing-blocks, propelling-wheels mounted on the shaft, screws mounted on the body and extending through the rods, springs arranged on the screws and engaging the rods, substantially as described.

In testimony whereof I have hereto affixed my signature in the presence of two witnesses.

THOMAS GUNDERSON.

Witnesses:
S. H. DREW,
W. S. SHORT.